(12) United States Patent
Wyke et al.

(10) Patent No.: US 7,124,174 B2
(45) Date of Patent: Oct. 17, 2006

(54) ELECTRONIC INTERACTIVE COMMUNICATION SYSTEM AND THE METHOD THEREFOR

(75) Inventors: Kenneth C. Wyke, Culpeper, VA (US); John Moore, Falls Church, VA (US); Archie Spivey, Myrtle Beach, SC (US)

(73) Assignee: Lockheed Martin Corporation, Bethesda, MD (US)

( * ) Notice: Subject to any disclaimer, the term of this patent is extended or adjusted under 35 U.S.C. 154(b) by 195 days.

(21) Appl. No.: 10/321,438

(22) Filed: Dec. 18, 2002

(65) Prior Publication Data

US 2003/0119563 A1 Jun. 26, 2003

Related U.S. Application Data

(60) Provisional application No. 60/341,862, filed on Dec. 21, 2001.

(51) Int. Cl.
*G06F 13/00* (2006.01)
(52) U.S. Cl. .................. 709/219; 709/231; 719/328
(58) Field of Classification Search ............. 709/206, 709/207, 219; 719/328, 329
See application file for complete search history.

(56) References Cited

U.S. PATENT DOCUMENTS

| 5,904,727 | A | | 5/1999 | Prabhakaran | 701/208 |
|---|---|---|---|---|---|
| 6,144,848 | A | * | 11/2000 | Walsh et al. | 455/419 |
| 6,150,961 | A | | 11/2000 | Alewine et al. | 340/995 |
| 6,275,226 | B1 | * | 8/2001 | Uchida et al. | 715/744 |
| 6,285,875 | B1 | * | 9/2001 | Alajoki et al. | 455/423 |
| 6,356,836 | B1 | * | 3/2002 | Adolph | 701/208 |
| 6,384,849 | B1 | * | 5/2002 | Morcos et al. | 715/810 |
| 6,480,121 | B1 | * | 11/2002 | Reimann | 340/990 |
| 6,526,285 | B1 | * | 2/2003 | Matsumoto et al. | 455/457 |
| 6,535,229 | B1 | * | 3/2003 | Kraft | 715/764 |
| 6,564,143 | B1 | * | 5/2003 | Alewine et al. | 701/207 |
| 6,636,805 | B1 | * | 10/2003 | Tada et al. | 701/209 |
| 6,718,425 | B1 | * | 4/2004 | Pajakowski et al. | 710/315 |
| 6,727,930 | B1 | * | 4/2004 | Currans et al. | 345/864 |
| 6,731,940 | B1 | * | 5/2004 | Nagendran | 455/456.1 |
| 6,738,618 | B1 | * | 5/2004 | Morales et al. | 455/419 |
| 2002/0029107 | A1 | * | 3/2002 | Jin et al. | 701/207 |
| 2002/0188402 | A1 | * | 12/2002 | Huang et al. | 701/213 |

OTHER PUBLICATIONS

International Search Report, PCT/US02/40727, mailed Apr. 21, 2003.

* cited by examiner

*Primary Examiner*—Viet D. Vu
(74) *Attorney, Agent, or Firm*—Marsh Fischmann & BreyFogle

(57) ABSTRACT

An electronic interactive communication system and method is disclosed. Software controls and a control manager resides on a unit that communicates with a central location. The central location transmits information to the unit. The information, or data, may reside in a database at the central location. A number of different units receive data from the central location's transmission source to update or manipulate data already on the units. The system exchanges data from the units to the central location using a narrow bandwidth. The unit includes a transceiver and a processor. The unit also includes a display to display the data to the user after the received data has been associated with the stored data. For example, received data is overlaid on a map being displayed on the unit.

19 Claims, 4 Drawing Sheets

ELECTRONIC INTERACTIVE COMMUNICATION SYSTEM AND THE METHOD THEREFOR

CROSS REFERENCE TO RELATED APPLICATIONS

This application claims benefit of U.S. Provisional Patent Application No. 60/341,862 entitled "Electronic Interactive Communication System and the Method Therefor", filed Dec. 21, 2001, which is hereby incorporated by reference.

BACKGROUND OF THE INVENTION

1. Field of Invention

The present invention relates to an electronic interactive communication system, and more particularly, to a system with improved control and optimally distributed interactive communication functionality between various device units.

2. Discussion of the Related Art

Various communication technologies, such as an e-mail technology that enables people to transmit and receive information to/from each other, are commercially known. Palm-size and/or portable communication devices that incorporate these technologies have become popular due to their portability and power. In the conventional technology, such communication devices are capable of transmitting and/or receiving communication messages and downloading and/or uploading information from other sources. The communication devices can download substantial data on the screen. For example, a portable Global Position System ("GPS") produces signals for a navigation system to allow directional navigation.

Conventional portable communication devices either store data in a database of the device or receive data from another device, such as a server. In use, the device shows the data in a display so that the user can manipulate the data. A Blackberry™ handheld portable communication system is an example. These devices, however, provide static data not updated in real-time because it may require an increased bandwidth for transmitting the data. Due to the limit of usage of the bandwidth, the conventional communication device may not transmit and receive the data in real time.

SUMMARY OF THE INVENTION

Accordingly, the disclosed embodiments are directed to a communication system and device that transmits real-time data information such that the information can be overlapped on existing data to display updates. The data information may be refreshed to ensure accuracy.

According to the disclosed embodiments, a data exchange system is disclosed. The data exchange system includes a transmitter coupled to a storage comprising data. The transmitter transmits a signal carrying the data. The data exchange system also includes a transceiver to receive the signal. The data exchange system also includes a processor coupled to a display to interpret the signal and to associate the received data within the signal with data accessible by the processor.

According to the disclosed embodiments, a data exchange processing unit is disclosed. The unit includes a processor for receiving data from a central source and a memory coupled to the processor for storing graphical data manipulable by a control. The data exchange processing unit also includes a display coupled to the processor to display received data and the graphical data according to the control. The data exchange system includes a manager to identify and administer the control, wherein the manager is enabled by the processor.

According to the disclosed embodiments, a method for exchanging data between a unit and a control center is disclosed. The method also includes receiving the data at a transceiver coupled to a processor on the unit from the control center. The method also includes manipulating graphical data via the processor with a control communicating with a manager. The method also includes associating said data with said graphical data.

According to the disclosed embodiments. A method for associating data transmitted to a unit having a memory is disclosed. The memory includes stored data accessible by a software control on the unit. The method includes launching the control within an operating environment on the unit. The method also includes retrieving the stored data from memory. The method also includes requesting an update for the stored data. The method also includes receiving update data at a transceiver on the unit. The method also includes associating the update data with the stored data. The method also includes displaying the stored data and the update data on the unit according to the control.

Additional features and advantages of the disclosed embodiments are set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Figure 1:
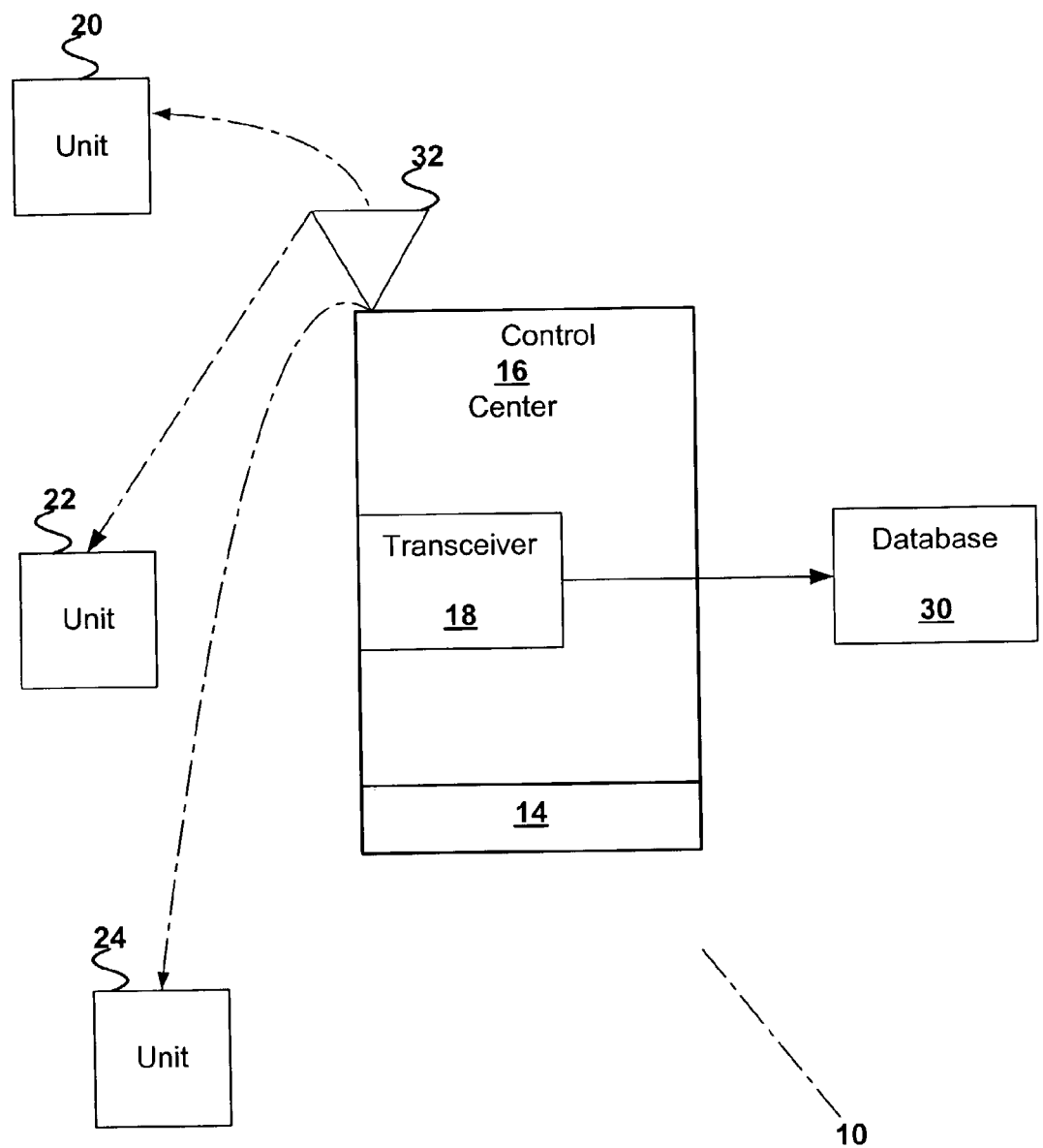
FIG. 1 illustrates a communication system in accordance with the disclosed embodiments.

FIG. 1 depicts a communication system 10 in accordance with the disclosed embodiments. Communication system 10 includes a number of communication units 20, 22, and 24 communicating under the control of a control node 14. Communication system 10 may be known as a data exchange system. In accordance with the disclosed embodiments, control node 14 is installed in a remote control center 16. In alternative embodiments, control node 14 is installed in units 20, 22, and 24 as a separate element. Control node 14 controls communications between two or more communication units 20, 22, or 24. Control node 14 may retrieve data from a database 30 to operate various control functions, as disclosed below.

Typically, in an operating environment, communication units 20, 22, and 24 may store various software controls. The controls may active or inactive within their operating environment. To be activated, the controls are toggled by other software or the operating system of the computer device using the control, such as, for example, control node 14.

Control center 16 also may include a transceiver 18 to transmit and receive information from units 20, 22, and 24. Transceiver 18 preferably communicates with units 20, 22, and 24 in a wireless manner. Alternatively, transceiver 18 and control center 16 may be coupled to units 20, 22, and 24 via cable, fiber optic wire, telephone line, coaxial cable, infrared, and the like. Transceiver 18 is coupled to database 30 to send information to units 20, 22, and 24. Control node 14 provides an interface to units 20, 22, and 24 for transceiver 18. Transceiver 18 is coupled to antenna device 32.

A software control on a unit, such as unit 24, may desire information that resides in database 30. Unit 24, via a resident software control manager, queries control center 16 for the data. Transceiver 18 receives the request and queries database 30. Database 30 provides the data and transceiver 18 forwards the data to unit 24. Control node 14 may facilitate this process by interacting with the software control manager on unit 24.

Further, control center 16 may provide periodic updates to units 20, 22, and 24 as new data becomes available. Transceiver 18 may receive update data from control node 14, database 30, or other components of control center 16. Periodic transmission of data may reduce the amount of bandwidth allocated for data transmission as units 20, 22, and 24 are not continually querying control center 16 for data. Data may be transmitted in a burst at certain times, and units 20, 22, and 24 are expecting to receive the data. The data may pertain to programs running on units 20, 22, and 24. For example, unit 20 executes a map function having controls to manipulate the map. Icons representing groups, units, or individuals may be overlaid on a map graphic. The icons are updated periodically with positional information from control center 16.

Figure 2:
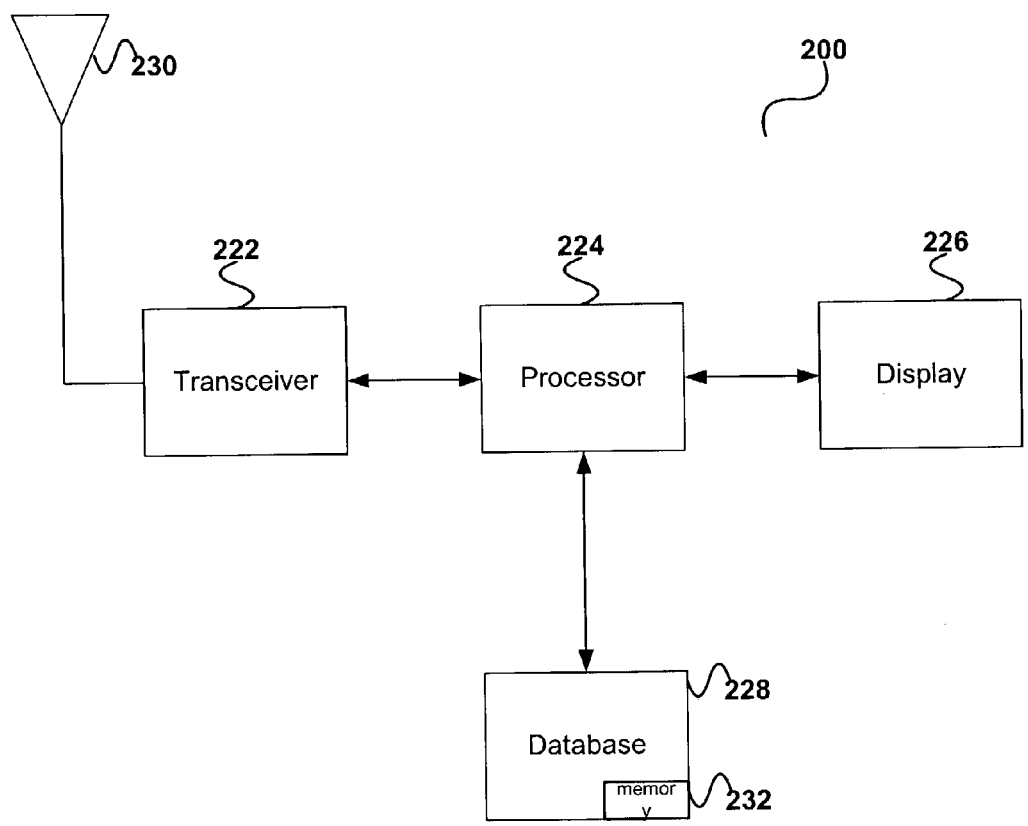
FIG. 2 illustrates a block diagram of a communication unit in accordance with the disclosed embodiments.

FIG. 2 depicts a block diagram of a communication unit 200 in accordance with the disclosed embodiments. Unit 200 may include any computer or device, such as a desktop, a portable computer, a laptop, a personal digital assistant ("PDA"), wireless phone, data node, or the like. Unit 200 also may be a network of computers or other data exchange devices. Unit 200 includes a transceiver 222 for receiving and transmitting signals by an antenna 230, a graphical user interface, or display, 226 for displaying data, a processor 224 for processing the received signals and signals to be transmitted, and a memory 228 for storing data and software controls. Unit 200 includes an operating environment to execute software programs, such as an operating system stored in memory 228. The operating environment also supports software controls that enhance the executing programs.

Processor 224 may be any processor that executes instructions stored in a memory, such as memory 228. Processor 224 retrieves/saves the data and software controls from/to database 228. Software controls may be stored in memory 228, and displayed on display 226. A user of unit 200 may input commands or requests via display 226 using the software controls. Processor 224 reacts to the inputs in a variety of ways, including querying memory 228. Processor 224 may activate transceiver 222 to exchange information with a remote control center, such as control center 16 in FIG. 1, in response to the inputs.

Preferably, processor 224 executes a program, or series of programs, on unit 200. Processor 224 retrieves data from memory 228 and displays graphical data in display 226. For example, a map program may be stored within memory 228. When executed, the map program displays map graphics on unit 200. Software controls to manipulate the map graphics also are stored in memory 228 and launched by processor 224. A software control manager may control the software controls. Memory 228 may store the software control manager. Processor 224 may execute the software control manager in conjunction with stored programs, software controls, and the like.

Unit 200 receives data and information via antenna 230 and transceiver 222. The data and information may be updates from a remote transmitter, as disclosed above. Processor 224 associates the new or updated data onto the data stored in memory 228. Display 226 shows the stored data and the updated data together. Preferably, processor 224 overlays the updated data onto the stored data in display 226. Thus, unit 200 receives updates in real time without continuous connections and increased bandwidth. As disclosed above, unit 200 may receive data in a periodic manner to reduce bandwidth requirements. Further, the disclosed embodiments enhance the display and representation of data within memory 228. Moreover, a filter may be placed on unit 200 to filter the data received at transceiver. If the data is not requested or authorized to be received, then the filter may prevent the data from undergoing any further processing at unit 200. Certain may be filtered from use on unit 200.

In other embodiments, transceiver 222 receives updates via antenna 230. Processor 224 determines the format for the data via user preference, default settings, and the like. The new data is correlated with stored data in memory 228 and displayed accordingly on display 226.

Figure 3:
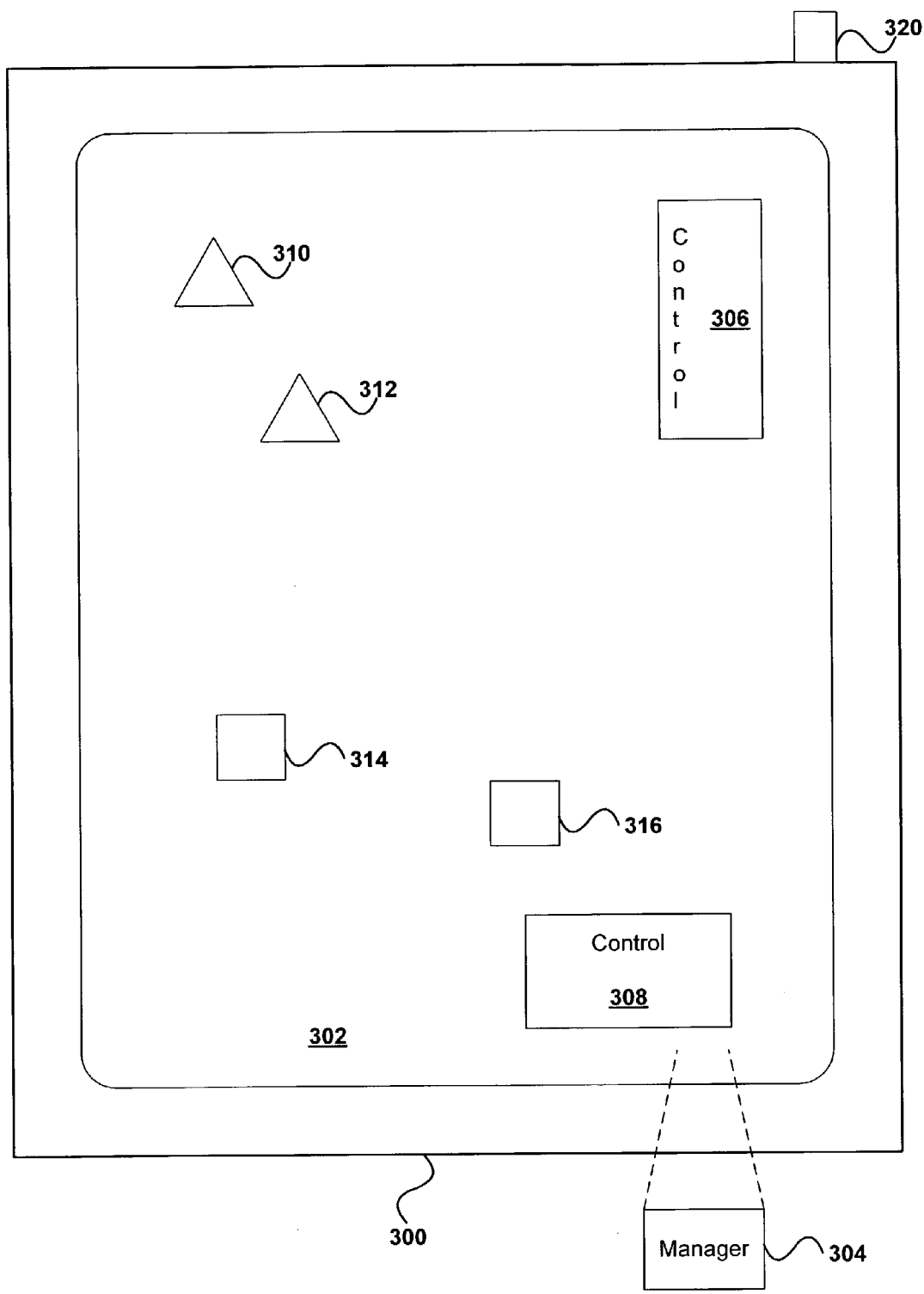
FIG. 3 illustrates a communication unit displaying data according to the disclosed embodiments.

FIG. 3 depicts a communication unit 300 displaying data according to the disclosed embodiments. Communication unit 300 includes an operating environment that supports executing programs. The operating environment also supports software controls 306 and 308, and software control manager 304. Unit 300 may display 306 and 308, while manager 304 is not displayed. Manager 304 facilitates communication with controls 306 and 308, and unit 300.

Further, controls 306 and 308 may not be identical controls, and may provide different functionality on unit 300. For example, controls 306 and 308 may be a map and a compass control, respectively. Map control 306 may not need compass control 308 to operate, while compass control 308 may need map control 306 to function.

Graphic 302 may be visual data displayed on unit 300. Graphic 302 may derive from data stored in a memory within unit 300. For example, graphic 302 may be a map. Icons 310, 312, 314, and 316 also are displayed on unit 300. Preferably, icons 310–316 overlay graphic 302. Icons 310–316 may relate to data being received by unit 300 via antenna 320. Icons 310 may reflect updated data from a remote location. Preferably, icons 310–316 move within the display of unit 300, and are independent of graphic 302. Icons 310 and 312 may be represent different entities than icons 314 and 316. For example, icons 310 and 312 may represent "enemy" units within an area represented by graphic 302, while icons 314 and 316 may represent "friendly" units. Alternatively, icons 310 and 312 may represent automobiles on graphic 302, while icons 314 and 316 represent trucks. As the entities represented by icons 310–316 move, this information is sent to unit 300 via antenna 320. Icons 310–316 are updated accordingly with this data. Thus, as unit 300 "refreshes" the display of graphic 302, icons 310–316 may move according to the updated or new data received from the remote location.

Controls 306 and 308 facilitate the display of graphic 302 and icons 310–316. Unit 300 may receive inputs at control 306 or 308. The inputs pertain to information regarding graphic 302 or icons 310–316. Manage 304 coordinates the inputs from control 306 or 308 by recognizing the applicable control and passing the information/request to processing logic within unit 300. If applicable, unit 300 may request an update from another unit or remote location via antenna 320. Once the requested data is received, manager 304 identifies the applicable control. Unit 300 updates graphic 300 or icons 310–316 accordingly.

For example, control 306 represents a map control and control 308 represents a compass control. If one presses "North" on compass control 308 displayed on unit 300, then compass control 308 requests that graphic 302 move north. Subsequently, map control 306 may receive a request to zoom in, and graphic 302 adjusts accordingly. Manager 304 facilitates these interactions between controls 306 and 308 and the displayed data.

Controls 306 and 308 may be known as e-Reusable Information Technology Environment ("eRITE") controls. Controls 306 and 308 may have additional properties above a typical software control. One property may be an eRITE type. An eRITE type may be a string such as "Map" or "Compass" that denotes the overall type of the control. The property allows manager 304 to identify the control against the other controls within the operating environment. Another property may be support members. Support members may be a string that lists the other controls that the identified control may need to use, such as the compass example disclosed above.

Control manager 304 may be known as an eRITE manager. Manager 14 may have properties, including the same properties disclosed above with reference to eRITE controls. Manager 14, however, may have certain properties unique to managers that allow them to manipulate controls 306 and 308. A property may be a control list that lists other controls to be used within the operating environment. These listed controls are the controls that are recognized by manager 304. The control list may be hard to view or change, and may be done under specific circumstances. Another property of manager 304 may be an information field that returns or sets the names of the data fields to display in a popup message box. Another property may be a storage directory that returns or sets the name of the eRITE storage directory.

The preferred embodiments may make use of specific controls that have specific uses within the operating environment. One control may be a data control that allows a user to touch appropriate data, or implement an auto refresh. An information control may setup filters within the operating systems to prevent redundant or erroneous information from being exchanged. The filters may be part of the security package within the unit, and may allow different capabilities.

A mode control may be implemented that enables buttons on the display to inform the manager what information to retrieve, such as maps, location data, and the like. The type of mode may determine how the information is to be displayed on the unit. For example, different maps may be used for different scenarios, and the maps may be changed by clicking a button on the display.

An active track data control also may be implemented to enable the operating environment to display or present itself in a different manner to the outside world. Each track for data on the display may be a separate entity that floats above the displayed graphic, such as a map. The track may be responsive to a mouse or cursor instruction. The data for the track may be received at the unit, preferably in a wireless manner. As information is received, then the track may be updated as it floats above the graphic display.

As disclosed above, manager 304 and controls 306 and 308 for the eRITE operating environment may be used on unit 300 to communicate with a central database coupled to a transmitter, as disclosed in FIG. 1. Specifically, a number of different units 300 may receive data from the transmission source from a communication device system and update and manipulate the data as desired within the system. Different controls may be activated that enable unit 300 to display and exchange the data. The data exchanged may include location of unit 300, and any other information selected by the user. The data is transmitted and unit 300 may include filters within the controls to display useful or selected data. Thus, the data displayed on one unit may not be the same data displayed on another unit or may be less than that transmitted. The filters may be enabled by the specific controls, manager 300, the operating environment, the user, and the like.

Figure 4:
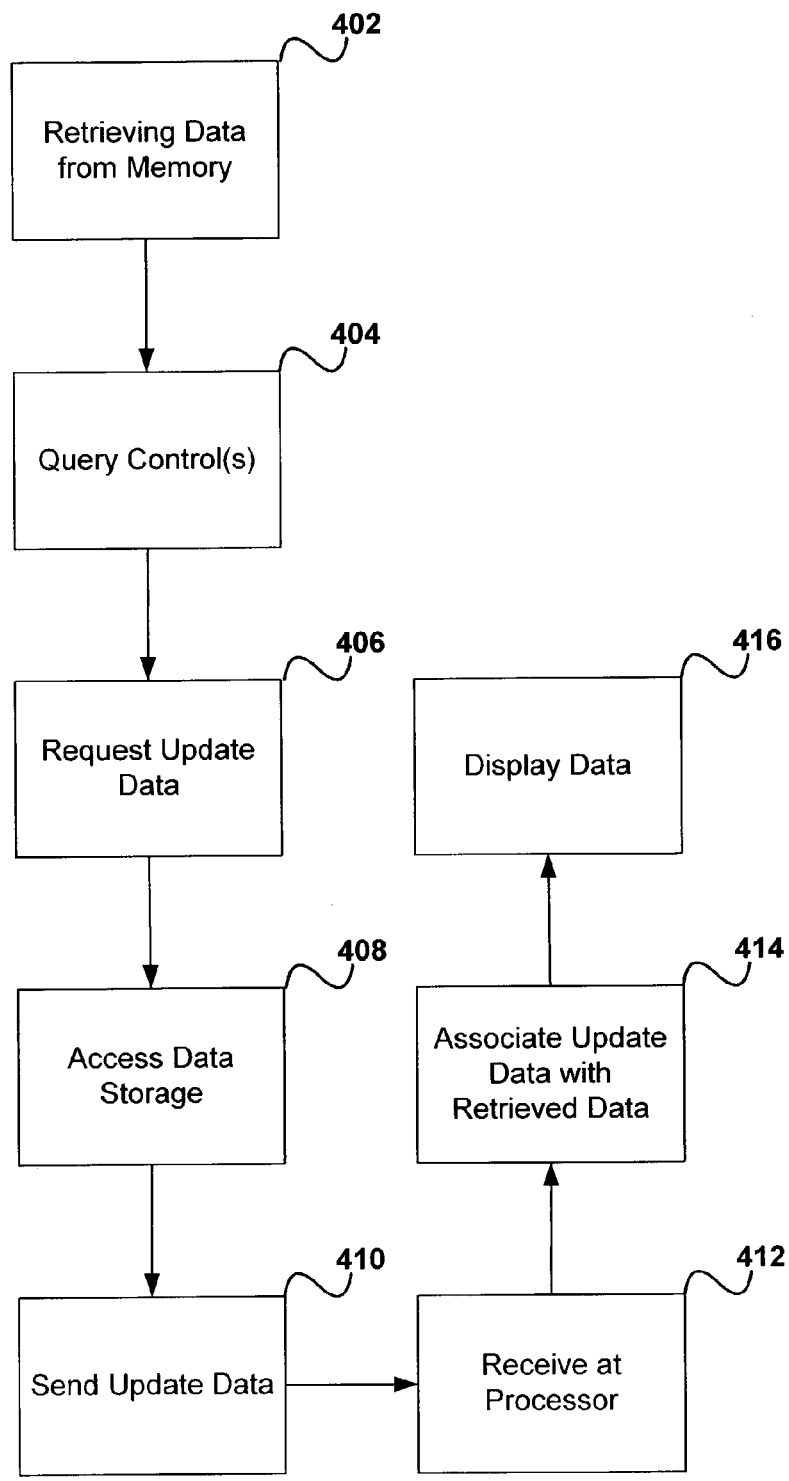
FIG. 4 illustrates a flowchart for exchanging data within an electronic communications system according to the disclosed embodiments.

FIG. 4 depicts a flowchart for exchanging data within an electronic communications system according to the disclosed embodiments. The data may be processed, and used on a unit or device having a processor. Step 402 executes by retrieving data stored data from a memory. The processor may receive a command to access and display data within the memory. In addition, software controls may be launched in response to the data being retrieved. The software controls may pertain specifically to the stored data and any resulting programs, or may be global controls launched at any time. Step 404 executes by querying applicable controls, or control, for input, commands, or requests for data. In addition, a control may receive a prompt at periodic intervals to receive input.

Step 406 executes by requesting update data to update or refresh the data accessed from the memory. The update data may come from a remote location, or from other controls or memory on the unit. Preferably, a remote control center having a database or other memory provides the update data. Step 448 executes by accessing the data storage, or memory, that contains the update data. The memory may be random access memory that stores the update data for a short period of time, until the next update is available. Step 410 executes by sending the update data to the unit. If sent from memory on the unit, the processor executes the operations necessary to retrieve the update data. If the data is sent from a remote location, a transceiver may transmit the update data. Preferably, the remote location transmits the update data in a wireless manner.

Step 412 executes by receiving the update data at the processor. Additional components may be utilized in receiving the data, such as an antenna and a transceiver coupled to the processor. The processor may identify the control and stored data that corresponds the received data. Step 414 executes by associating the update data with the retrieved data. The retrieved data, as disclosed above, is stored in a memory coupled to the processor. The update data may not be identical to the retrieved data. For example, the retrieved data may be a map graphic while the update data may pertain to the position of an icon overlaying the map graphic. Step 416 executes by displaying the update data and the retrieved data on the unit.

It will be apparent to those skilled in the art that various modifications and variations can be made in the communication device system of the present invention without departing from the spirit of scope of the invention. Thus, it is intended that the present invention cover the modifications and variations of this invention provided that they come within the scope of any claims and their equivalents.

What is claimed is:

1. A data exchange system, comprising:
 a plurality of communication units; and
 a control center including:
  a control node; and
  a transceiver operable to receive requests for update data, query a database for update data in response to requests for update data from said communication units, and transmit a signal carrying said update data, said transceiver being further operable to periodically transmit update data to said communication units without receiving requests for update data;
 wherein each said communication unit includes:
  a memory having graphical data stored therein;
  a transceiver operable to transmit a request for update data to said control center and to receive said signal carrying said update data from said control center;
  a processor coupled to a display to interpret said signal and to associate said received update data within said signal with stored graphical data accessible by said processor from said memory;
  a plurality of controls wherein each said control includes properties identifying a type of said control and any other controls said control may need to use in order to operate, and wherein said received update data and said graphical data are displayed on said display by said processor according to said controls; and
  a control manager that interacts with said control node of said control center to facilitate request and reception of the update data, wherein said control manager administers said controls and includes a property listing said controls recognized by said control manager.

2. The system of claim 1, wherein said display displays said received update data associated with said stored graphical data.

3. The system of claim 1, further comprising a filter coupled to said processor to select said update data from said signal.

4. A data exchange processing unit, comprising:
 a transceiver;
 a processor operable to activate said transceiver to receive update data requested from a central source and also receive update data periodically transmitted from the central source without a request for update data;
 a memory coupled to said processor for storing graphical data manipulable by a plurality of controls wherein each said control includes properties identifying a type of said control and any other controls said control may need to use in order to operate, the processor being further operable to associate said received update data with said stored graphical data;
 a display coupled to said processor to display said received update data and said graphical data according to said controls; and
 a control manager to identify and administer said controls wherein said control manager includes a property listing said controls recognized by said control manager and wherein said control manager is enabled by said processor and interacts with a control node of the central source to facilitate request and reception of the update data.

5. The unit of claim 4, wherein said update data from said central source is transmitted over a wireless network.

6. The unit of claim 4, wherein said control operates in an operating environment that supports said manager.

7. The unit of claim 4, further comprising an antenna coupled to said transceiver.

8. The unit of claim 4, wherein said received update data is displayed as software icons.

9. A method for exchanging update data between a unit and a control center, comprising:
 retrieving graphical data stored in memory on said unit;
 querying plurality of software controls executing on said unit for requests for update data, wherein each said control includes properties identifying a type of said control and any other controls said control may need to use in order to operate;
 requesting update data from the control center using a control manager on said unit that interacts with a control node of said control center, wherein said control manager administers said controls and includes a property listing said controls recognized by said control manager;
 receiving, at a transceiver coupled to a processor on said unit, said requested update data from said control center and update data periodically transmitted from said control center without a request for update data;
 manipulating said graphical data via said processor with one or more of said controls administered by the control manager; and
 associating said update data with said graphical data.

10. The method of claim 9, wherein said associating includes overlaying said update data onto said graphical data.

11. The method of claim 9, further comprising displaying said graphical data associated with said update data on said unit.

12. The method of claim 9, further comprising accessing a data storage at said control center.

13. The method of claim 9, further comprising querying controls for said graphical data.

14. A method for associating update data transmitted to a unit having a memory, wherein said memory includes stored graphical data accessible by a plurality of software controls on said unit, comprising:
 launching said controls within an operating environment on said unit, wherein each said control includes properties identifying a type of said control and any other controls said control may need to use in order to operate;
 retrieving said stored graphical data from memory;
 requesting an update for said stored graphical data from a control center using a control manager on said unit that interacts with a control node of said control center, wherein said control manager administers said controls and includes a property listing said controls recognized by said control manager;
 receiving, at a transceiver on said unit, said requested update data from said control center and update data periodically transmitted from said control center without a request for update data;
 associating said update data with said stored graphical data; and
 displaying said stored graphical data and said update data on said unit according to said controls.

15. The method of claim 14, further comprising accessing a data storage at a central location that transmits said update data.

16. The method of claim 14, further comprising filtering said update data at said unit.

17. The system of claim 1 wherein requests for update data and said signal carrying update data are transmitted over a wireless network.

18. The method of claim 9 wherein said steps of requesting update data and receiving said update data are accomplished using a wireless network.

19. The method of claim 14 wherein said steps of requesting an update and receiving update data are accomplished using a wireless network.

* * * * *